United States Patent [19]

Leining

[11] 4,417,367
[45] Nov. 29, 1983

[54] MID-SECTION SKINNING APPARATUS

[75] Inventor: Lyndon R. Leining, Austin, Minn.

[73] Assignee: Geo. A. Hormel & Company, Austin, Minn.

[21] Appl. No.: 353,526

[22] Filed: Mar. 1, 1982

Related U.S. Application Data

[63] Continuation-in-part of Ser. No. 43,041, May 29, 1979, Pat. No. 4,351,088.

[51] Int. Cl.³ .......................... A22B 5/16; A22C 17/12
[52] U.S. Cl. ........................................... 17/21; 99/589
[58] Field of Search ...................... 17/21; 99/584, 585, 99/587, 589, 598

[56] References Cited

U.S. PATENT DOCUMENTS

| | | | |
|---|---|---|---|
| 3,100,515 | 8/1963 | Schill | 99/589 |
| 3,245,107 | 4/1966 | Kolman | 17/21 X |
| 3,744,407 | 7/1973 | Harlan et al. | 99/589 |
| 4,025,986 | 5/1977 | Koken | 17/21 |

Primary Examiner—Willie G. Abercrombie
Attorney, Agent, or Firm—Williamson, Bains, Moore & Hansen

[57] ABSTRACT

An apparatus for removing the mid-section portion of the skin from the carcass of an animal, such as a hog, includes a revolvable drum mounted on a frame. A flap forming mechanism is mounted on the drum and is operable to form a skin flap and grip the same to hold the skin against the drum during the skinning operation. A skinning blade is mounted on the frame and positioned adjacent the drum to cut the skin from the torso. A skin hold-back mechanism is mounted on the frame and includes an arm having a blade which engages the drum to remove the skin from the drum. This hold-back device engages the drum and dislodges the skin from the toothroll cavity when the mid-section portion of the skin is completely removed from the animal. The frame is mounted on a shock absorbing device which absorbs vertical forces transmitted to the frame during the skinning operation.

11 Claims, 18 Drawing Figures

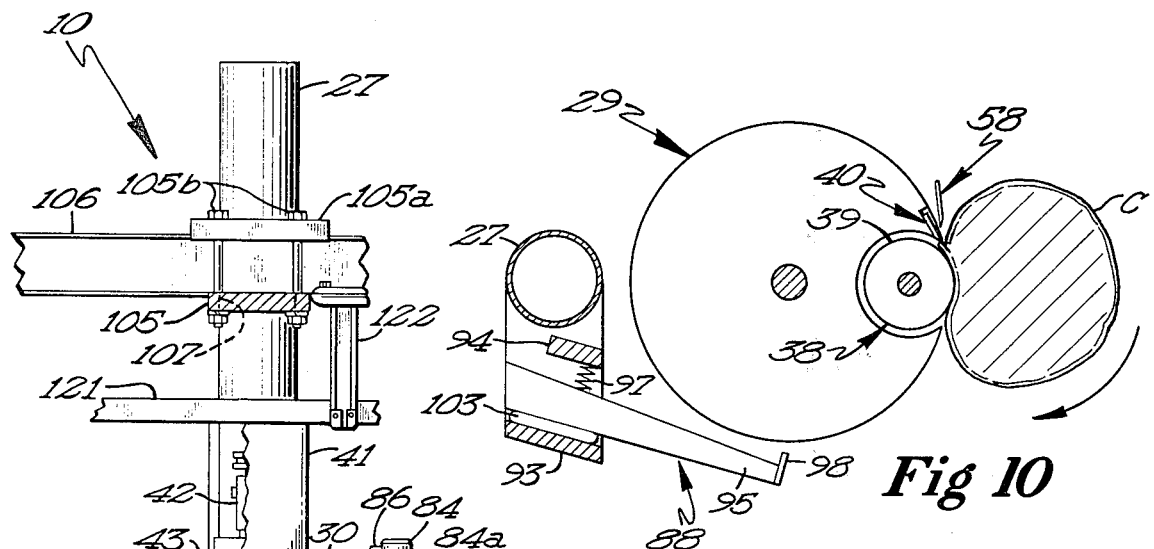
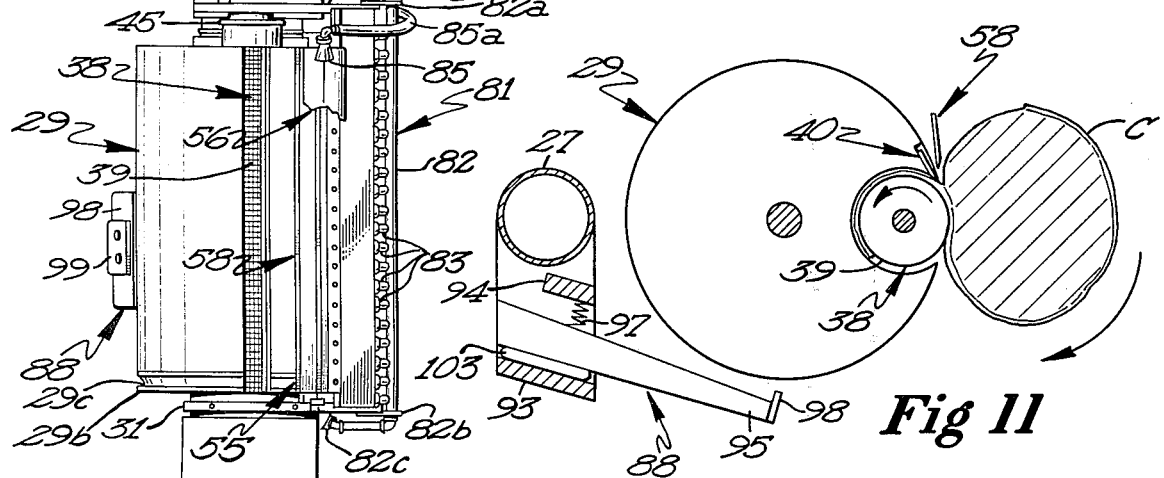
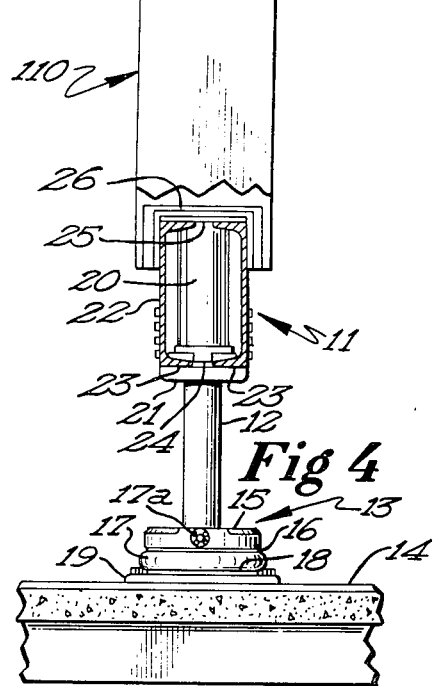
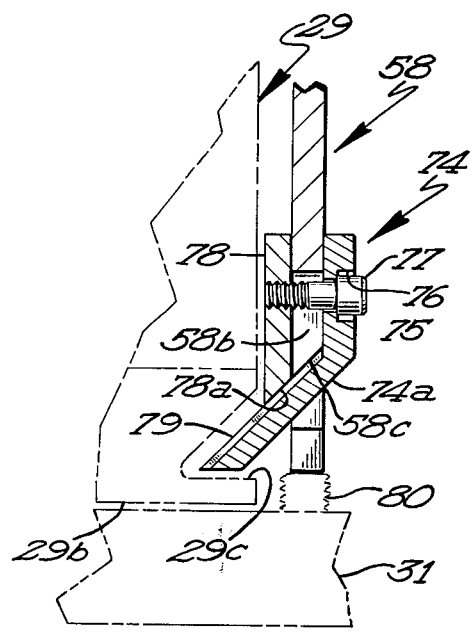
Fig 4
Fig 10
Fig 11
Fig 17

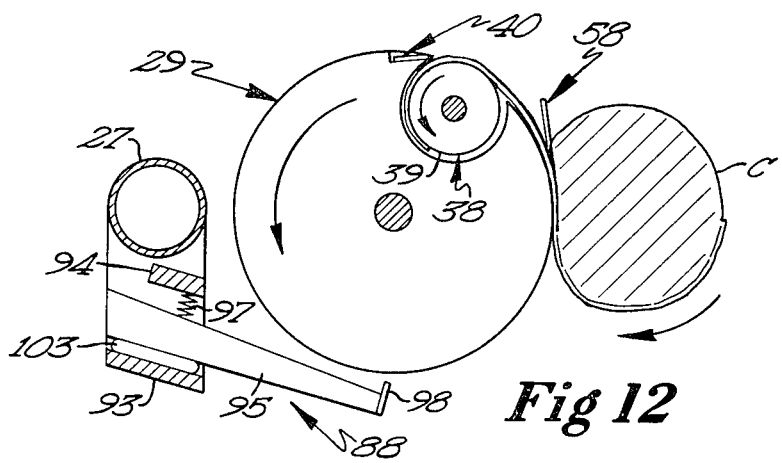
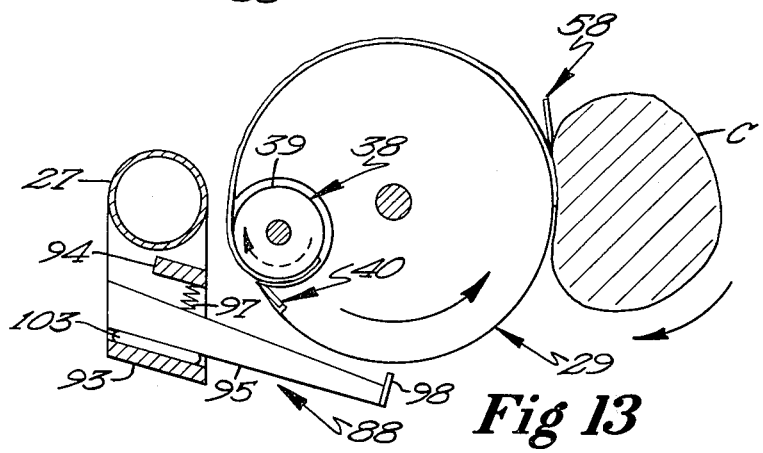
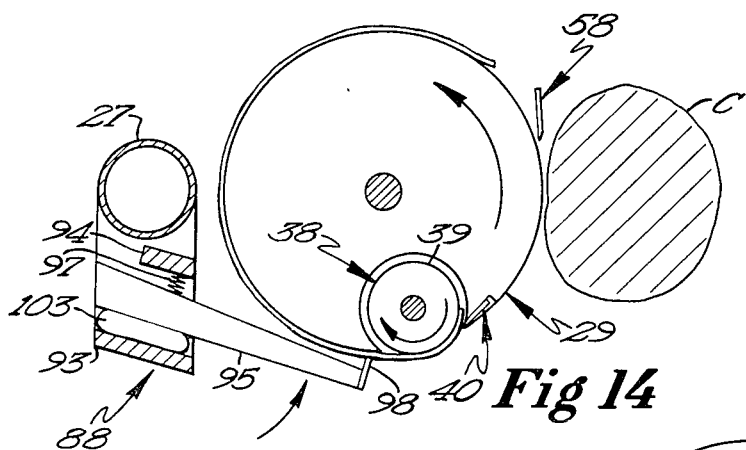
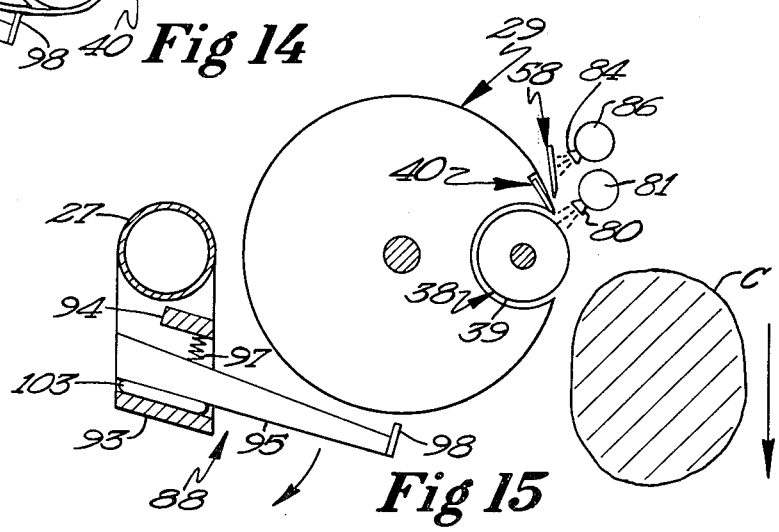

MID-SECTION SKINNING APPARATUS

SUMMARY OF THE INVENTION

This invention relates to an apparatus for removing the mid-section portion of the skin from the carcass of an animal such as a hog and is a continuation in part application of U.S. patent application Ser. No. 43,041, filed May 29, 1979, now U.S. Pat. No. 4,351,088 and entitled "Method and Apparatus for Removing Skin from Animal Carcasses."

The apparatus disclosed in my co-pending application, Ser. No. 43,041, permits the mid-section portion of the skin to be removed from a hog carcass as the skin is gripped and pulled against a floating knife by a flap forming and gripping mechanism mounted within a rotating drum. It has been found that improved results may be obtained if this apparatus is capable of slight tilting to accommodate variations in size and configuration of the hog carcasses. It will be appreciated that the hog carcass is held against the substantially vertically disposed skinning drum by suitable pneumatic actuated arms.

It has also been found that the skin removed from the mid-section portion of the hog carcass tends to wind back into the toothroll cavity after the skin has been removed from the hog. It is therefore desirable to provide means that would automatically operate to remove the skin from the drum at the completion of the skinning cycle.

It is therefore a general object of this invention to provide a novel and improved apparatus for removing the mid-section portion of the skin from the carcass of an animal such as a hog including a revolvable skinning drum mounted on a frame which is provided with a yieldable shock absorbing support means that permits limited tilting of the entire apparatus during the skin removing operation to accommodate variations in the size and configuration of the hog carcasses.

Another object of this invention is to provide an apparatus for removing the mid-section portion of the skin from hog carcasses including a revolvable skinning drum and a skin hold-back mechanism which engages the skinning drum to remove skin from the toothroll clamping area at the completion of the skinning operation.

A further object of this invention is to provide a skinning apparatus which removes the mid-section portion of the skin from a hog carcass and which is provided with a sequential control system that permits the apparatus to form and grip a skin flap and pull the skin against a dull knife as the skinning drum is rotated, to then disengage the gripped skin and to thereafter remove the skin from the skinning drum.

These and other objects and advantages of my invention will appear more fully from the following description made in conjunction with the accompanying drawings wherein like reference characters refer to the same or similar parts throughout the several views.

FIGURES OF THE DRAWINGS

FIG. 4 is an end elevational view of the apparatus.

FIGS. 10 through 15 are a series of diagrammatic top plan views of the skinning apparatus illustrating the sequential steps involved in the skinning operation.

FIG. 17 is a sectional view of a portion of the dull blade assembly illustrating certain details of construction thereon.

DESCRIPTION OF THE PREFERRED EMBODIMENTS

Figure 1:
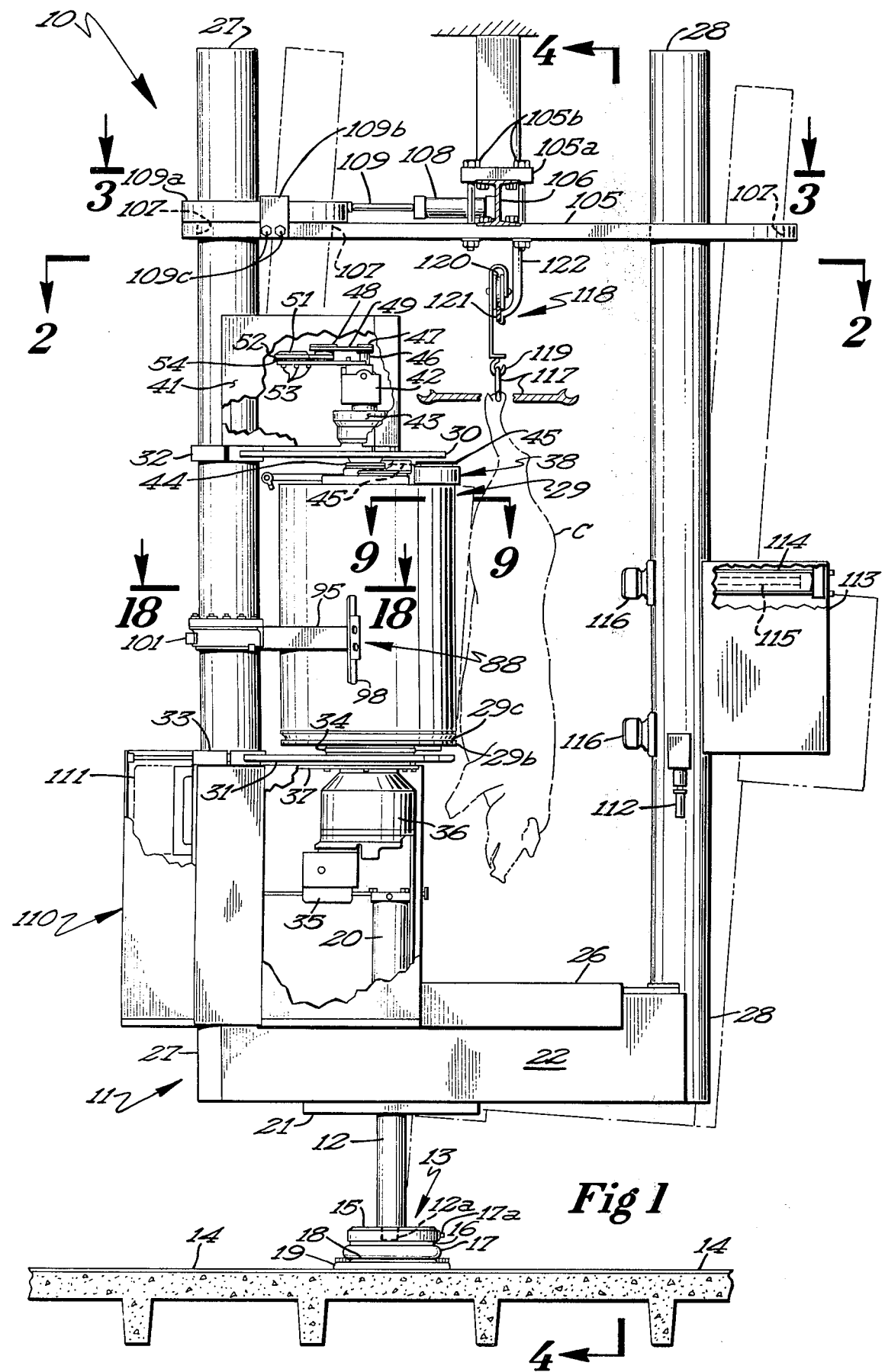
FIG. 1 is a side elevational view of the hog skinning apparatus.

Referring now to the drawings and more specifically to FIG. 1, it will be seen that one embodiment of the novel mid-section skinning apparatus, designated generally by the reference numeral 10, is thereshown. The skinning apparatus 10 includes a generally vertically orientated frame 11 which is comprised of a central vertically disposed support member 12. The lower end portion of the central support member 12 is connected to a shock absorbing device 13 which in turn is secured to a rigid horizontal support surface 14, which in the embodiment shown, is the floor of the building in which the skinning operation takes place. The shock absorbing device 13 includes a rigid circular member 15 formed of metal and having an opening in the central portion thereof through which projects the reduced end 12a of the central support member 12. The reduced end of the central support member is secured to a plate 16 which is disposed between the rigid circular member 15 and an inflated annular yieldable member 17 which in the embodiment shown has a configuration of an inflated tire. The inflated member 17 is secured to a lower plate 18 which in turn is rigidly affixed to an attachment plate 19, the latter being secured to the floor by suitable bolts. A valve type fitting 17a is mounted on the rigid member 15 and is connected in communicating relation with the inflated member 17. The shock absorbing device 13 serves to absorb vertical forces transmitted to the frame during the skinning operation and also permits slight lateral tilting of the frame in a manner to be described herein below.

The central support member 12 is actually a piston rod and telescopically projects into the vertically disposed hydraulic cylinder 20 at its upper end. The lower end of the hydraulic cylinder 20 is positioned against the horizontal substantially flat plate 21 having a centrally located opening therein and through which the support member or piston rod 12 projects. The horizontal plate 21 supports a pair of laterally spaced-apart vertically disposed channel members 22, the lower flange 23 of each channel member being positioned upon the support plate 21, as best seen in FIG. 4.

Referring again to FIG. 4, it will be seen that a pair of clamping plates 24 are each positioned upon one of the lower flanges 23 of each channel member and are secured thereto by suitable bolts. The uppermost flanges 23 of the channel members 22 support a horizontal plate 25 thereon which is secured thereto by suitable bolts. Referring now to FIGS. 1 and 4, it will be seen that an inverted channel shaped member 26 is positioned upon the flat upper plate 25 and the channel members 22 and are secured thereto by suitable bolts.

The lower horizontal plate 21, the upper horizontal plate 25 and the channel members 22 actually form a lower subframe assembly which is horizontally oriented and which is attached at one end thereof by suitable bolts to the lower end portion of a vertically disposed post 27. It will also be seen that the other end portion of the sub-frame assembly is secured by suitable bolts to the lower end portion of another post 28 which is spaced from the post 27 and disposed in substantially parallel relation thereto.

The skinning apparatus 10 includes a vertically disposed skinning drum 29 which is mounted on the frame for rotation relative thereto. In the embodiment thereshown, the skinning drum is mounted between an upper support plate 30 and a lower support plate 31. It will be seen that the upper support plate is provided with a split clamp 32 and the lower support plate is provided with a split clamp 33 each being secured to the post 27 intermediate the ends of the latter. The drum 29 is provided with a shaft which is journaled in suitable bearings mounted in the upper and lower support plates. In this regard, the lower support plate 31 is provided with a bearing 34 in which the drum shaft is journaled and the upper plate 32 is also provided with a bearing (not shown) in which the upper end of the drum shaft is journaled.

The drum 29 is driven by a hydraulic motor 35 whose output shaft is connected in a driving relation to a planetary gear reducer mechanism 36 which is drivingly connected to the drum shaft. The hydraulic motor-planetary gear reducer mechanism is mounted on the lower mounting plate by a mounting bracket 37. It will be seen that when the hydraulic motor 35 is energized, the drum 29 will be driven through the planetary gear reducer mechanism 36 to rotate in a counterclockwise direction as viewed in FIG. 2.

The drum 29 is substantially identical in construction to that disclosed in my co-pending application, Ser. No. 43,041, entitled "Method and Apparatus for Removing Skin from Animal Carcasses" and is provided with a flap forming and gripping device 38 comprising an elongate toothed, skin gripping roller 39 and flap forming blade 40 mounted within a recess 29a in the skinning drum 29. The construction of the toothed, skin gripping roller and flap forming blade are identical to that disclosed in my co-pending application, Ser. No. 43,041, and the disclosure in my co-pending application relating to the drum, toothed, skin gripping roller and flap forming blade is incorporated by reference herein.

Means are provided for driving and controlling the operation of the toothed roller 39 and this drive and control means is mounted within a housing 41 which is positioned upon the upper support plate 30 and is secured to the post 27 by suitable bolts, as best seen in FIGS. 1 and 4. The drive means includes a reversible hydraulic motor 42 which is connected in driving relation to a planetary gear reducer mechanism 43. The output shaft of the planetary gear reducer mechanism 43 has a sprocket 44 secured thereto for rotation therewith and the sprocket 44 is drivingly connected to a sprocket 45 by means of a chain 45a. Sprocket 45 is connected to the shaft of the toothed roller 39 whereby when the hydraulic motor 42 is energized the toothed roller 39 will be driven in either a forward or reverse direction.

Programmer means are also provided for controlling the sequence and direction of operation of the toothed roller, and this programmer means is also mounted in the housing 41. This programmer means includes a pulley 47 which is mounted on the output shaft 46 of the hydraulic motor 42. Pulley 47 is drivingly connected to a larger pulley 48 by an endless belt 49. A pulley 50 is mounted on the same shaft as the pulley 48 and is revolvable therewith, and this pulley 50 is drivingly connected to another pulley 51 by an endless belt 52. When the pulley 51 is revolved, it operates a plurality of pneumatic valve actuators 53 by means of a cam 54 affixed to the lower surface of the pulley 51. Operation of the pneumatic valve actuators controls operation of the hydraulic motor 42 during the skinning cycle.

Referring now to FIGS. 4, 6–9, 16 and 17, it will be seen that the skinning apparatus also includes a dull blade assembly 55 which is mounted between the upper support plate 30 and the lower support plate 31 adjacent the skinning drum 29. The dull blade assembly includes a substantially flat, vertically disposed outer mounting plate 56 and a vertically disposed inner mounting plate 57 with the dull cutting blade 58 positioned therebetween.

Figure 6:
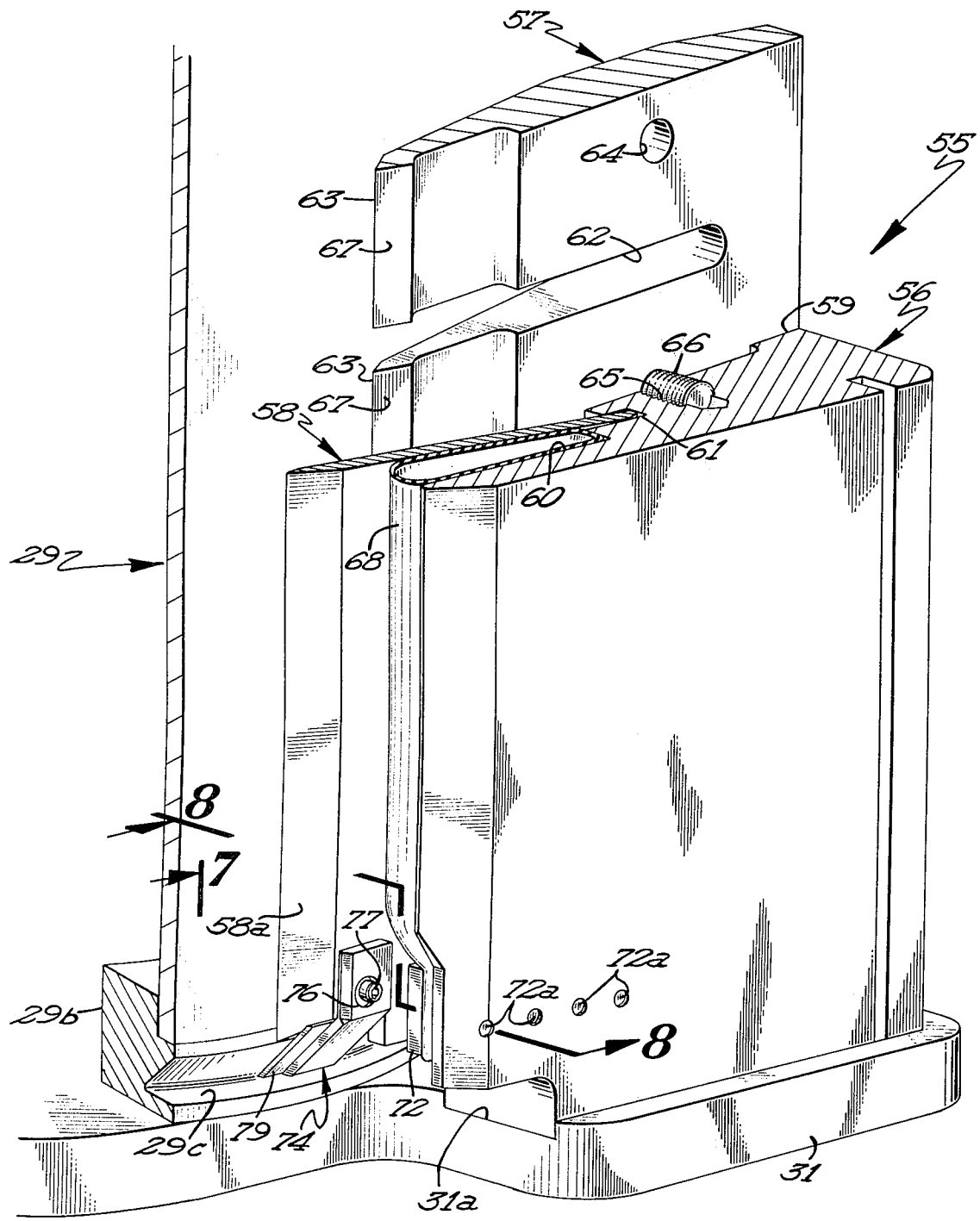
FIG. 6 is a partial perspective view of the lower portion of the dull blade assembly.

Referring now to FIG. 6, it will be seen that the lower end portion of the outer mounting plate 56 is positioned in a slot 31a of the lower mounting plate 31 and is secured thereto by a suitable bolt. Although not shown in the drawing, the upper end portion of the outer mounting plate 56 is mounted in a similar slot in the upper mounting plate 30. The dull blade 58 is provided with a cutting edge 58a positioned closely adjacent the drum 29, and the blade is of elongate generally rectangular construction. Its thickness dimension is relatively small compared to its length and width, and the blade can therefore flex along its length.

Figure 9:
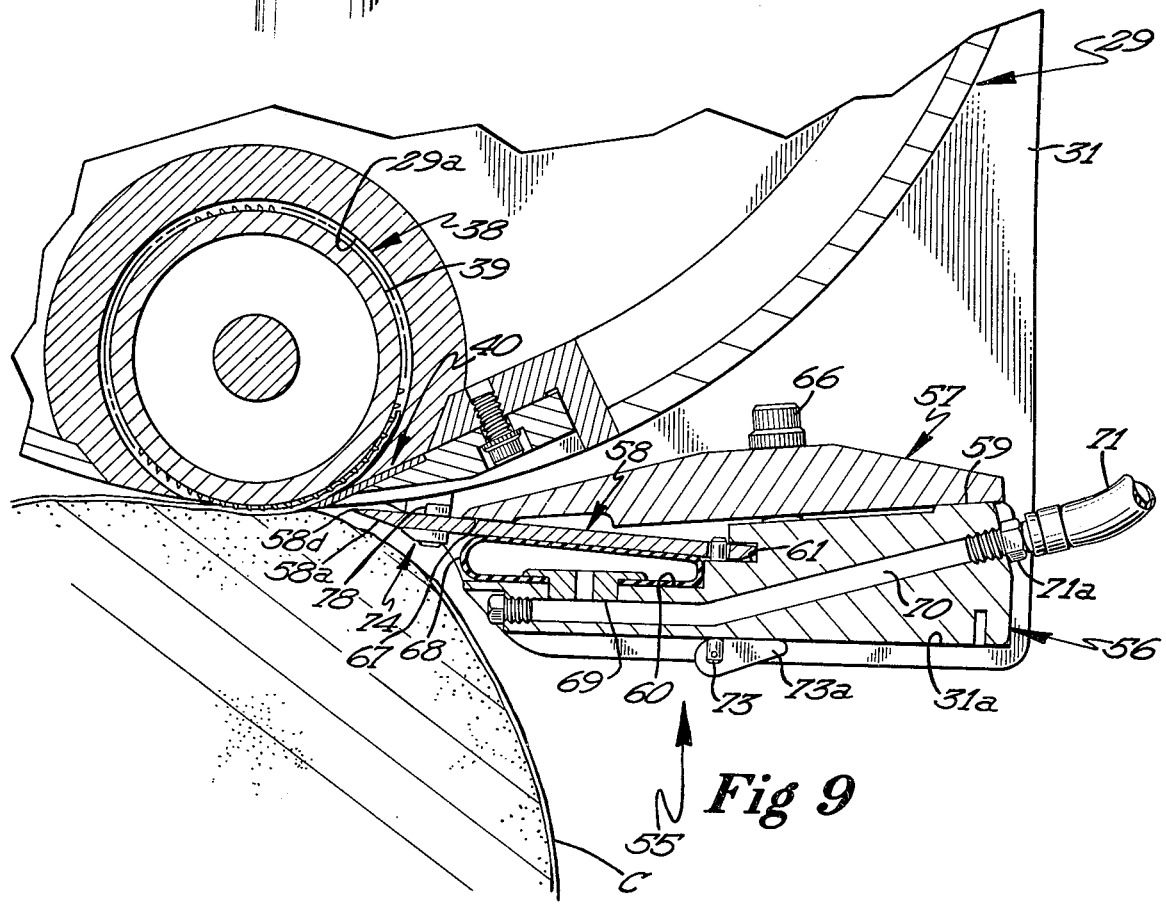
FIG. 9 is a cross-sectional view taken approximately along line 9—9 of FIG. 1 and looking in the direction of the arrows.

The outer plate 56 has an elongate rib 59 on its rear surface which extends throughout the length of the outer plate. The rib 59 engages the front surface of the inner plate 57, as best seen in FIG. 9. The outer plate 56 is also provided with a relatively large recess 60 and a vertical slot 61, each of which extends throughout the vertical dimension of the outer plate.

The inner plate 57 is provided with a plurality of horizontal slots 62 which extend inwardly from one vertical edge of the inner plate, and these slots are equally spaced apart to define a plurality of horizontally disposed fingers 63. Each finger 63 has an opening 64 therein which is disposed in registering relation with a threaded recess 65 in the outer plate 56 for accommodating a bolt 66 that serves to clamp the inner plate to the outer plate. Referring again to FIGS. 6 and 9, it will be seen that the inner plate 57 is provided with a relatively narrow elongate blade-engaging surface 67 which engages the dull blade throughout one longitudinal edge of the inner plate. It will therefore be seen that the inner plate 57 engages the outer plate 56 along the vertical rib 59 and that the inner plate engages the dull blade 58 along the blade-engaging surface 67.

Referring again to FIGS. 6 and 9, it will be seen that the end portion of the blade 58 is positioned in the vertical slot 61 of the outer plate 56. An air bag 68 is positioned in the recess 60 and the air bag 68 extends substantially throughout the length of the outer plate and engages one surface of the dull blade 58. The air bag 68 is provided with a fitting 69 that is connected in communicating relation with a passage 70 formed in the outer plate 56. The passage 70 is connected by fitting 71a to a conduit 71 which in turn is connected to a source of air under pressure.

Figure 8:
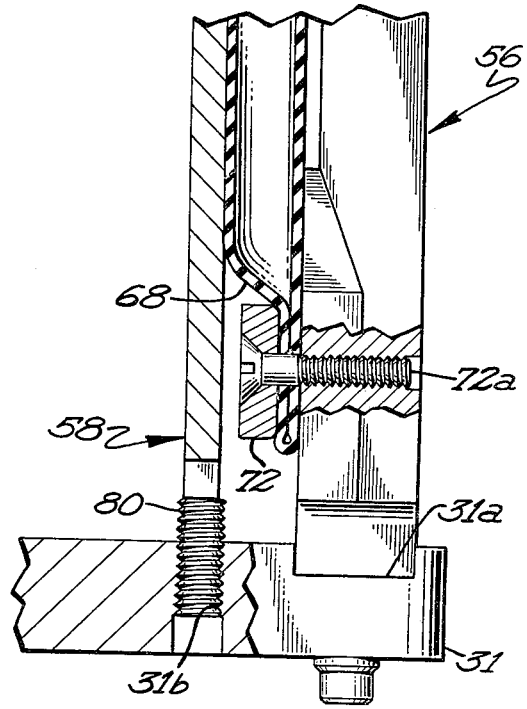
FIG. 8 is a cross-sectional view taken approximately along line 8—8 of FIG. 6 and looking in the direction of the arrows.

Referring now to FIGS. 6 and 8, it will be seen that the lower end portion of the air bag is clamped by clamping bar 72 against the outer plate 56 by bolt 72a which threadedly engages the outer plate. Although not shown in the drawing, a similar clamping bar clamps the upper end of the air bag to the outer plate. It is pointed out that the air bag is inflated during use of the skinning apparatus, and the dull blade is clamped between the inner plate and the air bag. The air bag allows the dull blade to float during the skinning operation.

Means are provided for retaining the skinning blade in mounted relation between the inner and outer plates, and this means includes spring-urged keeper pin 73, which projects through a slotted opening in the outer plate 56 and through an opening in the dull blade 58, as best seen in FIG. 9. This pin is provided with an actuating handle 73a which is pivotally connected to the associated pin and which is moveable between locked and open positions. In FIG. 9, the actuating handle 73a is illustrated in the locked position. When the handle 73a is pivoted so that it is substantially aligned with the pin 73, the pin will be retracted and this permits the blade to be selectively removed.

Figure 7:
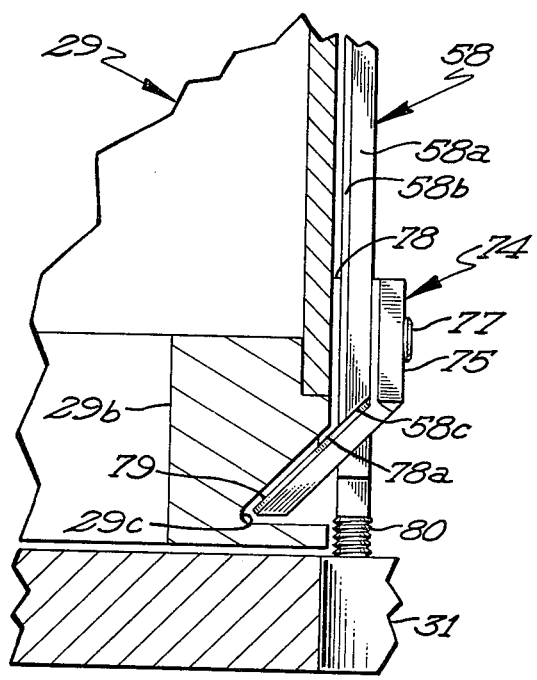
FIG. 7 is a cross-section view taken approximately along line 7—7 of FIG. 6 and looking in the direction of the arrows.
Figure 16:
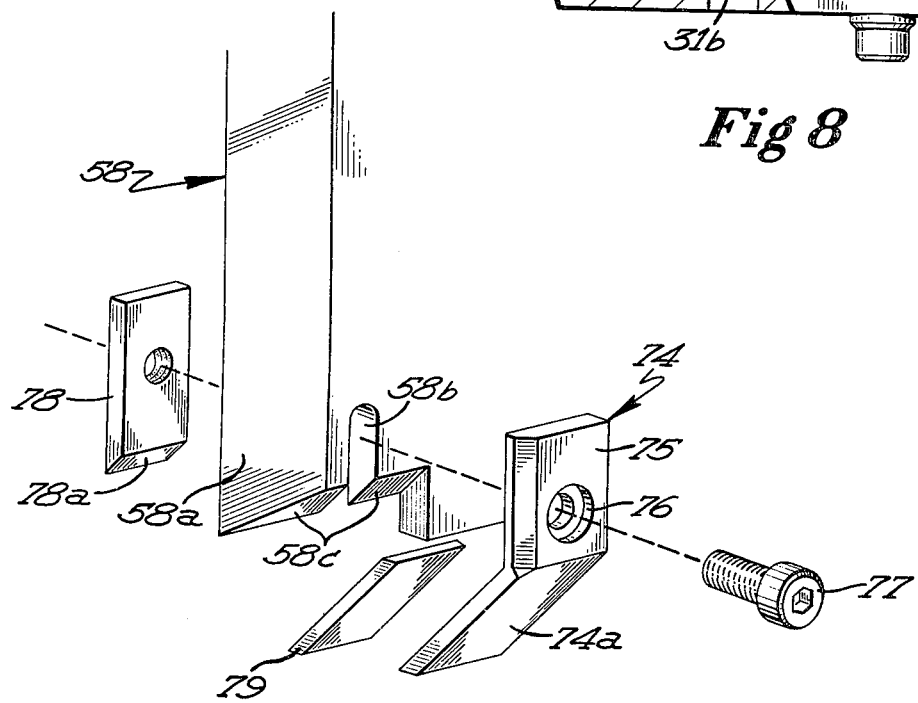
FIG. 16 is a partial exploded perspective view of a portion of the dull blade assembly.

The dull blade assembly also includes a marking blade device, designated generally by the reference numeral 74, and illustrated in FIGS. 6, 7 and 16. The marking blade device 74 includes an attachment portion 75 having an opening 76 therethrough which is disposed in registering relation with an opening 58b in the lower end portion of the dull blade 58. A bolt 77 projects through the opening 76 and the opening in the lower end portion of the blade 58 and threadedly engages a small bracket 78 which is positioned against the dull blade 58. The marking blade device 74 also includes an angularly disposed blade-engaging portion 74a that engages a relatively thin, disposable marking blade 79 that is clamped by the blade-engaging portion against the beveled surface 58c at the lower end of the dull blade 58. The blade 79 is disposed at substantially a 45° angle to more effectively cut through the skin.

Referring now to FIGS. 6 and 7, it will be seen that the drum 29 is provided with an annular ring 29b at its lower end which is disposed closely adjacent the lower support plate 31. The ring 29b is provided with an outwardly opening annular groove 29c therein and the marking blade 79 projects into this groove. The marking blade forms a circular cut in the skin of the hog carcass during the skinning operation, and this circular cut will be made adjacent the shoulder areas of the hog carcass. The marking blade device 74 can also be adjusted vertically, and the means of accomplishing this include an adjustment screw 80 which engages in a threaded recess 31b in the lower mounting plate 31 and projects upwardly therefrom to engage the lower surface of the dull blade 58. It will be seen that by adjusting the screw 80, the blade 58 can be vertically shifted, which causes the marking blade device attached thereto to be similarly shifted.

During the skinning operation, it will be seen that the air bag 68 will be inflated to some predetermined degree and the amount of pressure used controls how easily the dull blade floats along the inside of the skin. In this regard, the cutting edge 58a of the blade will be spaced from the surface of the drum 29 a predetermined amount, and this spacing, generally referred to as the null gap, permits the passage of the skin between the cutting edge of the blade and the drum. The null gap should be set so that the spacing is less than the thinnest part of the skin, and the spacing should be sufficient so that the blade will never engage the drum surface. The air bag permits the blade to float during the skinning operations to adjust to irregularities in the skin.

The blade may also be adjusted longitudinally by selectively adjusting the bolts 65 that project through the inner plate 57 and engage the outer plate. By adjusting these bolts, a selected finger 63 may be urged against the dull blade a greater degree than other fingers, thereby causing some deflection of the blade in a local area. Since the blade can flex in a longitudinal direction, this kind of fine tuning permits a uniform null gap to be maintained in case of blade warp. The gap may also be varied along its length to minimize the number of torn skins during the skinning operation.

The dull blade assembly 55 is also provided with a spraying device 81 which sprays hot water on the drum and on the dull blade at the completion of the skinning cycle to maintain the drum and the dull blade in a sanitized and clean condition. This spraying device includes an elongate vertically disposed drum spraying manifold 82 having its upper end affixed to an upper bracket 82a and having its lower end affixed to a lower bracket 82b. The upper bracket 82a is affixed to the upper support plate 30 and the lower bracket 82b is affixed to the lower support plate 31. The drum spraying manifold 82 is provided with a plurality of vertically spaced apart spray nozzles 83 which are arranged to direct a plurality of streams of water against the drum throughout substantially its entire axial length. The manifold 82 is provided with a valve 84 which is connected to a conduit 84a, the conduit being connected to a source of hot water under pressure.

The lower end portion of the manifold is provided with a spray nozzle 82c which is positioned slightly below the drum and is directed thereagainst in a slightly upward direction. The spray nozzle 82c serves to remove any hair that may accumulate in this area during the skinning operation.

Figure 2:
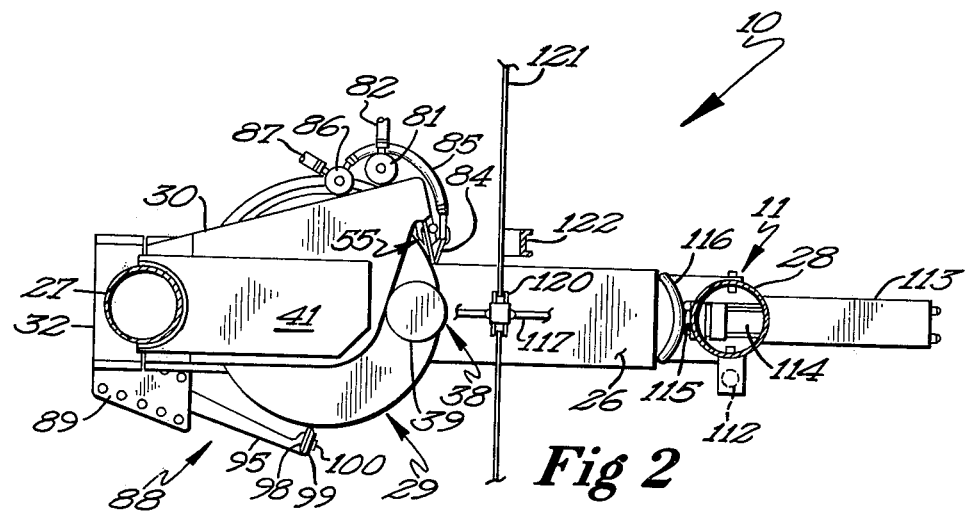
FIG. 2 is a cross-sectional view taken approximately along line 2—2 of FIG. 1 and looking in the direction of the arrows.

A spray nozzle 85 is mounted on the dull knife assembly adjacent the upper portion of the dull blade. The spray nozzle 85 is connected to a conduit 85a which is connected to a valve 86. The valve 86 is connected in turn to a conduit 87, as best seen in FIG. 2, which is connected in communicating relation to a source of hot water under pressure. The spray nozzle 85 serves to spray hot water downwardly over the surface of the dull blade at the end of the skinning cycle. Operation of the spraying device occurs automatically in a predetermined manner at the completion of the skinning cycle.

Figure 18:
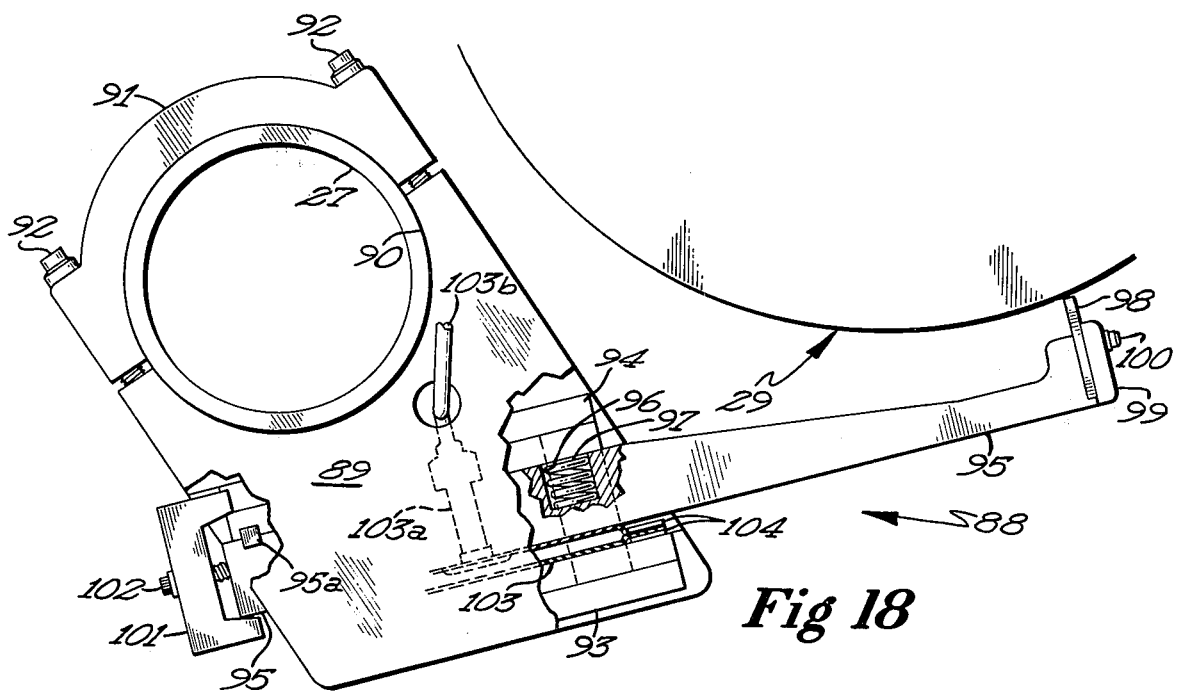
FIG. 18 is a cross-sectional view taken approximately along line 18—18 of FIG. 1 and looking in the direction of the arrows.

Referring now to FIGS. 1, 2 and 18, it will be seen that the mid-section skinning apparatus also includes a skin hold-back assembly 88 which serves to engage and strip the skin from the drum 29 after the skin has been removed from the hog carcass. The skin hold-back assembly 88 is mounted on the post 27 at a height located intermediate the ends of the drum 29. In this regard, the skin hold-back assembly 88 is provided with a mounting plate 89 which has an arcuate surface 90 and engages the post 27. A collar member 81 is also clamped against the post and is secured to the mounting plate 89 by suitable bolts 92. The mounting plate 89 is horizontally oriented and is provided with an outer vertical plate 93 affixed to the lower surface thereof and projects downwardly therefrom adjacent one edge thereof. An inner vertical plate 94 is also affixed to the lower surface of the mounting plate 89 and depends downwardly therefrom as best seen in FIG. 18. It will be noted that the inner vertical plate 94 is disposed in spaced apart substantially parallel relation with respect to the outer vertical plate 93.

An elongate hold-back arm 95 has one end portion thereof positioned between the inner and outer vertical plates and projects outwardly therefrom. The hold-back arm 95 has a recess 96 therein in which is positioned a helical spring 97. It will be noted that the recess 96 is located intermediate the ends of the arm 95 and engages the inner vertical plate 94 to normally urge the arm away from the inner vertical plate. The outermost end of the hold-back arm is provided with a blade 98 which is clamped against the end of the arm by a clamping plate 99, the latter being secured to the arm by a bolt 100.

Rearward movement of the arm 95 is limited by a stop plate 93. A C-shaped element 101 keeps key 95a engaged to take out loads imparted by skin.

The hold-back assembly 88 is provided with an inflatable member 103 which is disposed between the hold-back arm 95 and the outer vertical plate 93. A retaining bar 104 extends between the inner and outer plates and is affixed thereto adjacent their respective lowermost edges. This retaining bar serves to retain the inflatable member and the hold-back arm between the inner and outer vertical plates. The inflatable member 103 is provided with a fitting 103a that communicates therewith, and the fitting is connected to a conduit 103b which in turn is connected to a source of air under pressure. With this arrangement, the inflatable member may be selectively inflated or deflated during the skinning cycle. It will be noted that when the inflatable member 104 is inflated, the arm will be pushed against the bias of the spring 97 to urge the blade 98 of the arm to a position closely adjacent the drum. On the other hand, when the inflatable member 103 is deflated, the spring 97 urges the arm and the blade 98 outwardly away from the drum. In this regard, when the arm 95 is urged away from the drum, the toothed roller 39 may pass beneath the blade. Further, when the hold-back arm is retracted away from the drum 29, the blade 98 will also be spaced from the skin which is held against the drum by the toothed roller. However, when the inflatable member 103 is inflated, the blade 98 will be moved inwardly to engage the skin to prevent movement of the skin as the drum rotates relative thereto. When this occurs, the skin which has been removed from the carcass will be disengaged from the drum and will drop upon a suitable conveyor (not shown).

Figure 3:
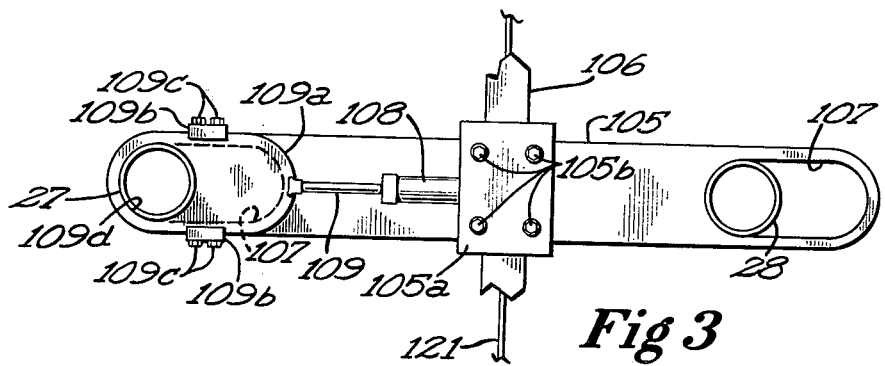
FIG. 3 is a top plan view of the apparatus illustrated in FIG. 1.
Figure 5:
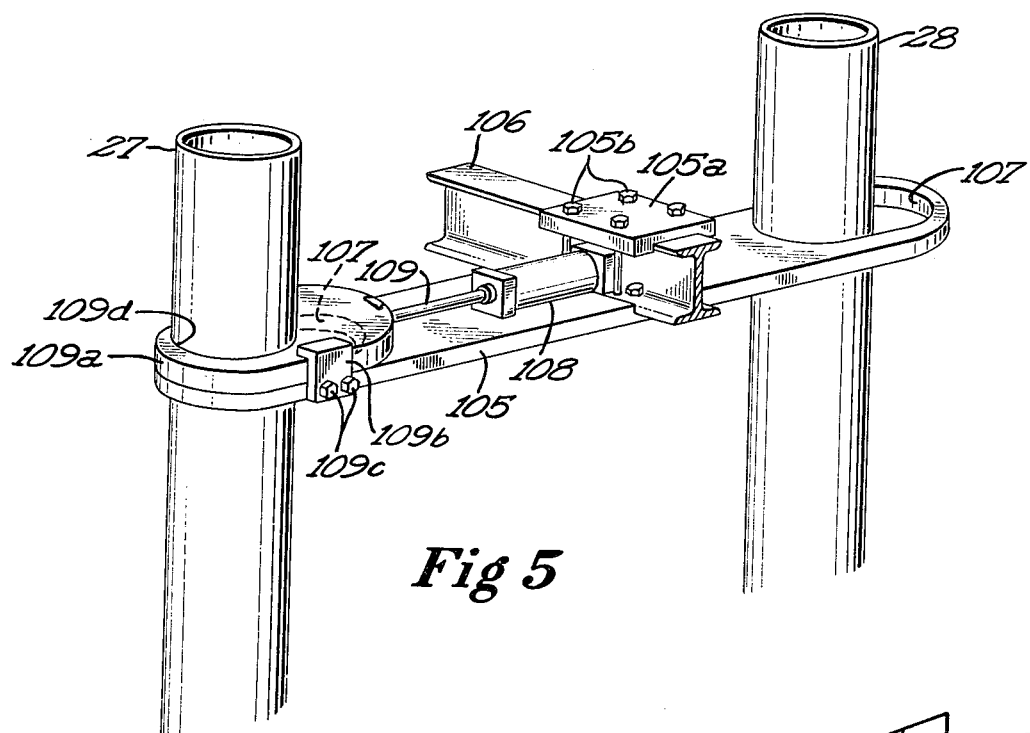
FIG. 5 is a perspective view of the upper portion of the hog skinning apparatus illustrating details of construction thereof.

Referring now to FIGS. 3 to 5, it will be seen that means are provided for producing limited tilting movement of the frame 11 during the skinning operation. This means includes a horizontally disposed substantially flat limit plate 105 which is clamped intermediate its ends to a beam 106. The beam 106 is secured to the building in which the skinning apparatus is positioned. The plate 105 is secured to an upper clamping plate 105a by bolts. The horizontal limit plate 105 is therefore fixed relative to the frame 11 which is capable of limited tilting movement with respect to the shock absorbing device 13.

The limit plate 105 is provided with a pair of elongate openings 107 therein, each slot being disposed adjacent one end thereof and each accommodating either the post 27 or 28 therethrough. A double acting pneumatic cylinder 108 is mounted on the beam 106 and is provided with a piston rod 109 which is connected to the annular member with an elongate opening therein like the opening 107. When the piston rod 109 is in the extended condition, as shown in FIG. 3, the frame will be in the vertical position relative to the horizontal support upon which it is supported. However, when the piston rod 109 is retracted, the piston rod will pull the annular member 109a which in turn pulls the post 27. The frame will be tilted to the right, as shown in FIG. 1, to slightly tilt the drum with respect to the hog carcass. In the embodiment shown, the tilting movement of the upper portion of the drum 29 is approximately six inches and this permits the drum to more effectively accommodate hog carcasses of different sizes and configuration.

Referring again to FIG. 1, it will be seen that a housing 110 is mounted on the post 27 adjacent the lower end portion thereof. A moving part logic control circuit 111 is mounted in the housing 110 and sequentially controls the operation of the various mechanisms comprising the skinning apparatus. The skinning apparatus is also provided with a control handle 112 which is revolvable and vertically shiftable for initiating operation of the skinning apparatus.

Means are also provided for moving the hog carcass against the drum 29 at the beginning of the skinning cycle to assure firm contact with the toothed roller and flap forming blade. To this end, a housing 113 is mounted on the post 28 intermediate the ends thereof and generally in the area of the drum 29. The housing 113 has a pair of pneumatic cylinders 114 mounted therein, each pneumatic cylinder having a piston movable therein to which is connected a piston rod 115. Each piston rod has an arcuate carcass engaging element 116 at its outer end for engaging the carcass of the hog to be skinned. In this regard, it will be noted that the pneumatic cylinders 114 are vertically spaced apart and the carcass engaging element 116 on one piston rod is adapted to engage the carcass adjacent the ham area, while the other carcass engaging element is adapted to engage the carcass adjacent the shoulder area. The pneumatic cylinders 114 are controlled by the pneumatic logic control circuit 111 during the skinning operation. In this regard, the pneumatic logic control circuit 111 controls the operational sequencing of the pneumatic cylinders 114, the toothed roller, the drum, the hold-back assembly, and the dull blade assembly including the spray device.

The hog carcass to be skinned is designated generally by the reference character C in the drawing. The carcass is suspended by a gambrel 117 which is secured to the rear legs of the hog so that the hog is suspended with its head downwardly. The gambrel is secured to a trolley 118 which includes a hook 119. The eye of the gambrel 117 engages the hook of the trolley and the trolley wheel 120 is rollably mounted on an overhead track 121. The track 121 is mounted by suitable brackets 122 to a beam 106 which is rigidly affixed in the building in which the skinning apparatus is located.

During the skinning operation, as pointed out hereinabove, skin from the hind leg will be removed from the hog carcass in the initial skinning operation and thereafter the skin will be removed from the ham portions of the hog carcass. Thus, when the hog carcass reaches the mid-section skinning apparatus 10, the skin will have been removed from the rearmost portion of the hog carcass as it is suspended from the overhead rail.

Referring now to FIGS. 10 through 15, it will be seen that the various sequential operations of the mechanisms comprising the mid-section skinning apparatus are illustrated diagrammatically to more clearly show the steps involved in this skinning operation. Referring now specifically to FIG. 10, it will be seen that when the skinning cycle is initiated, the operator will grip the control handle 112 and will rotate the handle to initiate the cycle. In the event that the skinning drum is not properly positioned with respect to the length of the hog carcass, the operator may move the control handle in an upward or downward direction to initiate the correct positioning of the frame 11. It is pointed out that when the operator moves the handle 112 downward, the hydraulic cylinder 20 will move downwardly relative to the piston rod or central vertical support member 12 thereby lowering the drum relative to the hog carcass C. On the other hand, if the control handle is moved upwardly the hydraulic cylinder 20 will be raised relative to the support member 12, thereby raising the frame and the drum relative to the hog carcass. This adjustment will be made prior to the rotation of the handle 112.

When the handle 112 is rotated, the pneumatic logic control circuit 111 will cause the pneumatic piston rods 115 to be extended to thereby press the hog carcass against the surface of the drum. The pneumatic cylinder 108 will also be energized to shift the piston rod in a retractive direction to thereby tilt the frame slightly to the right, as viewed in FIG. 1, so that the drum will engage the hog carcass adjacent the ham areas thereof. After the hog has been clamped against the now tilted drum, the toothed roller 39 will be revolved in a forward or counterclockwise direction as viewed in FIG. 10. The flap forming blade 40 will cut the torso portion of the skin throughout it length and the toothed roller will rotate to grip and pull the flap in a forward or counterclockwise direction. The inflatable member 70 for the dull knife assembly 55 will also be inflated when the skinning cycle is initiated thereby moving the dull blade into close proximity to the drum 29.

The toothed roller will continue to rotate to wind a flap portion of skin thereon and the piston rods 115 will retract as 109 extends. It is pointed out that the toothed roller will over-pull the flap so that the width dimension of the flap is approximately twelve inches. Thereafter, the drum 29 will begin to rotate in a forward or counterclockwise direction, as best seen in FIG. 12, and the flap will unwind approximately two inches from the toothed roller during the initial rotation of the drum so that a flap of approximately ten inches is gripped by the toothed roller. The toothed roller will continue to be driven in a forward direction during rotation of the drum 29, but the toothed roller does not actually rotate relative to the drum. The combined effect of rotating the toothed roller while simultaneously rotating the drum in the same direction produces a stall in the movement of the toothed roller even though the hydraulic motor 42 is energized to rotate the toothed roller in a forward or counterclockwise direction.

Referring again to FIG. 12, it will be seen that the drum will continue to rotate, thereby pulling the skin against the dull blade assembly which causes separation of the skin from the hog carcass C. During the skin removal operation, the wide bevel along the cutting edge 58a biases the blade towards the drum. However, the pressure applied by the air bag serves to hold the reverse bevel 58d of the dull blade against the skin. The pressure in the air bag is preset low enough to insure that the skin is not split when the skinning operation begins and is automatically increased during the last half of the skinning process to minimize fat left on the trailing edge of the skin. The air bag is used over other means because it evenly distributes pressure along the dull blade while allowing the blade to flex and twist and follow the variations in the skin thickness for maximum fat yield on the carcass. In this regard, the blade 58 can also pivot or rock in the slot 61 of the outer plate 56. The slot 61 is larger than the thickness dimension of the blade 58 to permit this limited pivoting movement. This pivotal axis of the blade 58 is generally in line with the cutting edge of the blade. Therefore, the blade 58 is not only capable of flexing and twisting movement, but it is also capable of pivotal movement. The skin will adhere to the surface of the drum as the drum rotates and the hydraulic motors for the drum and the toothed roller will continue to be energized until the drum rotates through an arc of approximately 180 degress, as illustrated in FIG. 13. At this point in the skinning cycle, the hydraulic motor 42 which drives the toothed roller will be de-energized, which allows the skin flap wound about the toothed roller to begin to unwind partially as the drum continues in a forward or counter-clockwise direction. The flap will not wind completely from the toothed roller, but will be retained thereby until the drum rotates through an arc of approximately 280 degrees, as illustrated in FIG. 14. At this point, the inflatable member 109 of the hold-back assembly will be inflated to move the hold-back arm and its clamping blade from a retracted position (FIGS. 9 through 12) to an extended position whereby the blade 98 will engage the skin. It will be appreciated that the toothed roller will have moved arcuately past the hold-back assembly when the hold-back arm moves into drum-engaging relation. The blade 98 will engage the skin but will permit the drum to rotate relative to the skin. When the hold-back assembly is energized to move the arm into engaging relation with the skin, the hydraulic motor 42 for the toothed roller will be energized to rotate the toothed roller in a clockwise direction relative to the drum, as shown in FIG. 14. When this occurs, the flap will be unwound from the toothed roller and the hold-back arm assembly will cause the flap to be disengaged from the toothroll cavity. The skin which has been removed from the hog carcass will drop from the drum upon a suitable conveyor and will be removed to a suitable collection point.

When the toothed roller has completed its reverse cycle, the hydraulic motor 42 will be de-energized and the skin flap will be released simultaneously. Simultaneously, the dull blade assembly will be retracted because the skin will have been cut from the hog carcass. It will be appreciated that the dull blade assembly will be retracted when the inflatable member 70 is deflated. The pneumatic control circuit will cause the inflatable member 70 to be deflated when the toothed roller has completed its reverse cycle. The pneumatic logic circuit will cause the inflatable member 103 for the hold-back assembly to be deflated as the drum approaches 360 degrees of rotation and the hold-back arm will be retracted. The pneumatic logic control circuit will also operate to actuate the valves 81 and 86 to begin the spraying cycle and the drum and knife blade will be sprayed as the drum is rotated through 360 degrees of rotation. After the spraying and cleaning cycle is complete, the hydraulic motor 35 will be de-energized so that the drum will cease its rotation and the apparatus will then be in condition for another skinning cycle.

From the foregoing description, it will be seen that I have provided a method and apparatus which permits efficient removal of the skin from the mid-section portion of a hog carcass in a sequentially and automatically controlled series of steps. Thus it will be seen that my novel mid-section skinning apparatus operates in a more efficient manner than any heretofore normal comparable arrangement.

While the preferred embodiments of the present invention have been described, it should be understood that various changes, adaptions, and modifications may be made therein without departing from the spirit of the invention and the scope of the appended claims.

What is claimed is:

1. An apparatus for removing the mid-section portion of the skin from the carcass of an animal such as a hog, comprising:
    a vertically disposed support frame,
    a revolvable cylindrical drum revolvably mounted on said frame,
    drive means drivingly connected with said drum for revolving the same,
    an elongate skinning blade extending longitudinally of and positioned in close proximity to said drum,
    a flap forming blade on said drum and extending longitudinally thereof and making a longitudinal cut in the mid-section portion of the carcass when the carcass is positioned against said drum, gripping means on said drum engaging a longitudinal cut edge of the skin pulling a portion of the skin against the flap forming blade to form and grip the flap of the skin, whereby when said drum is revolved, the skinning blade will progressively remove the mid-section portion of the skin from the carcass,
    a skin removing assembly including an elongate arm, means mounting one end portion of said arm on said frame, a blade on the other end of said arm, means for shifting said arm between operative and inoperative positions, said arm when in the operative position positioning the blade in close proximity to the drum to remove carcass-disengaged skin therefrom, and said arm when in the inoperative position disposing said blade in spaced relation to said drum.

2. The apparatus as defined in claim 1 and means for yieldably mounting the lower end portion of said frame on a support surface whereby vertical forces exerted on said frame during the skinning operation will be transmitted to said yieldable mounting means.

3. The apparatus as defined in claim 2 wherein said yieldable mounting means includes an inflated yieldable member.

4. The apparatus as defined in claim 1 wherein said means for shifting said arm to the operative position is an inflatable member.

5. The apparatus as defined in claim 2 wherein said yieldable mounting means supports said frame for limited tilting movement during said skinning operation, and power means engaging said frame for laterally shifting the same from a vertical position to a slightly tilted position.

6. An apparatus for removing the mid-section portion of the skin from the carcass of an animal such as a hog, comprising:
    a generally vertically disposed support frame, means yieldably mounting the lower portion of said frame on a support surface whereby vertical forces exerted on said frame during the skinning operation will be transmitted to said yieldable mounting means,
    a revolvable cylindrical drum mounted on said frame for revolving movement relative thereto,
    drive means drivingly connected with said drum for revolving same,
    a skinning blade positioned in close proximity to said drum,
    a flap forming blade on said drum making a longitudinal cut in the mid-section portion of the skin of the carcass when the carcass is urged against said drum, gripping means on said drum engaging a longitudinal cut edge of the skin for pulling a portion of the skin against the flap forming blade to form and grip a flap of the skin, whereby when said drum is revolved, the skinning blade will progressively remove the mid-section portion of the skin from the carcass,
    and shiftable carcass engaging means mounted on said frame and being shiftable towards and away from said drum, said carcass engaging means when shifted towards said drum holding the carcass against the gripping means until a skin flap is gripped by the latter.

7. An apparatus for removing the mid-section portion of the skin from the carcass of an animal such as a hog, comprising:
    a support frame,
    a revolvable cylindrical drum revolvably mounted on said frame,
    drive means drivingly connected with said drum for revolving the same,
    an elongate skinning blade adjacent said drum means mounting said blade on said frame to position the cutting edge thereof in close proximal relation with said drum and permitting limited pivoting movement of the blade about an axis disposed in approximate elongate alignment with said cutting edge, yieldable means urging said blade towards said drum, and
    gripping means on said drum engaging a longitudinal skin flap whereby when said drum is revolved, the skinning blade will progressively remove the mid-section portion of the skin from the carcass.

8. The apparatus as defined in claim 7 wherein said drum has an annular groove therein adjacent the lower end thereof, a marking blade mounted on the lower end portion of said skinning blade and projecting into said groove whereby said marking blade will make a circular cut in the skin of the hog carcass during rotation of said drum.

9. The apparatus as defined in claim 7 wherein said yieldable means comprises an elongate pressurized inflated air bag.

10. The apparatus as defined in claim 7 wherein said mounting means for said skinning blade include inner and outer clamping plates, said blade being positioned between said plates, means on one of said plates defining a plurality of fingers engaging said blade, and means engaging said fingers for selectively shifting each finger relative to the other fingers to produce local flexing of the skinning blade and thereby adjust the spacing of a length of the cutting edge relative to the drum.

11. The apparatus as defined in claim 10 wherein said yieldable means comprises an air bag interposed between and engaging said outer clamping plate and said blade.

* * * * *